US012172279B2

(12) United States Patent
Knyrim et al.

(10) Patent No.: US 12,172,279 B2
(45) Date of Patent: Dec. 24, 2024

(54) POWER TOOL HAVING TWO MOTORS

(71) Applicant: Hilti Aktiengesellschaft, Schaan (LI)

(72) Inventors: Maximilian Knyrim, Ehingen (DE); Michael Wierer, Röthis (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/039,558

(22) PCT Filed: Nov. 16, 2021

(86) PCT No.: PCT/EP2021/081831
§ 371 (c)(1),
(2) Date: May 31, 2023

(87) PCT Pub. No.: WO2022/117332
PCT Pub. Date: Jun. 9, 2022

(65) Prior Publication Data
US 2024/0009822 A1 Jan. 11, 2024

(30) Foreign Application Priority Data
Dec. 4, 2020 (EP) .................................... 20211791

(51) Int. Cl.
*B25D 11/00* (2006.01)
*B25D 11/12* (2006.01)
*B25D 16/00* (2006.01)

(52) U.S. Cl.
CPC ............ *B25D 11/125* (2013.01); *B25D 16/00* (2013.01); *B25D 2211/003* (2013.01); *B25D 2250/245* (2013.01); *B25D 2250/281* (2013.01)

(58) Field of Classification Search
CPC ................................................ B25D 2250/281
See application file for complete search history.

(56) References Cited

U.S. PATENT DOCUMENTS

2008/0314610 A1 12/2008 Meixner et al.
2022/0226951 A1 * 7/2022 Greunke .................. B25F 5/00

FOREIGN PATENT DOCUMENTS

CN 106335031 B 6/2020
DE 2343661 A1 3/1975
DE 102005062861 A1 7/2007
(Continued)

OTHER PUBLICATIONS

International Search Report of PCT/EP2021/081831 dated Jan. 18, 2022.

*Primary Examiner* — Eyamindae C Jallow
(74) *Attorney, Agent, or Firm* — Davidson Kappel LLC

(57) ABSTRACT

Power tool, in particular a hammer drill, including a housing, a tool fitting for receiving and holding a tool, an impact device for producing and transmitting impact pulses to the tool, and a rotation device for producing and transmitting a torque to the tool, wherein a working axis passing through the impact device is provided. The power tool includes a first drive unit having a first axis of rotation for driving the rotation device and a second drive unit having a second axis of rotation for driving the impact device, wherein the first and second drive units are arranged in such a way relative to one another in the housing that the first axis of rotation of the first drive unit is arranged at a first angle to the second axis of rotation of the second drive unit and at a second angle to the working axis.

14 Claims, 3 Drawing Sheets

(56) References Cited

FOREIGN PATENT DOCUMENTS

| | | | | | |
|---|---|---|---|---|---|
| DE | 102008054458 | A1 | | 6/2010 | |
| EP | 0345896 | A2 | | 12/1989 | |
| EP | 345896 | B1 | * | 9/1994 | ......... B23Q 11/0046 |
| FR | 2625931 | A | * | 7/1989 | ........... B25D 16/006 |
| FR | 2625931 | A1 | | 7/1989 | |
| GB | 2086777 | A | * | 5/1982 | ............. B25D 16/00 |
| WO | WO 2012084316 | A1 | | 6/2012 | |

* cited by examiner

POWER TOOL HAVING TWO MOTORS

The invention relates to a power tool, in particular a hammer drill, comprising a housing, a tool fitting for receiving and holding a tool, an impact device for producing and transmitting impact pulses to the tool, and a rotation device for producing and transmitting a torque to the tool, wherein a working axis passing through the impact device is provided.

BACKGROUND

Various power tools in the form of hammer drills are known from the prior art. A hammer drill is a machine for drilling holes in mineral materials such as rock or concrete. Among the components of the hammer drill are a rotary drive and an impact mechanism. By means of the rotary drive, a drilling tool held by the hammer drill is rotated about an axis of rotation (also referred to as the working axis). The impact mechanism serves to produce impact pulses on the drilling tool along the working or impact axis. By means of the impact pulses, the cutting edge of the drilling tool breaks down the material to be worked. Usually, these hammer drills known from the prior art have just one electric motor as a drive, which drives both the rotary drive and the impact mechanism via a relatively complex transmission.

SUMMARY OF THE INVENTION

However, these prior-art power tools configured as hammer drills often have the problem that the transmission for distributing the torque produced by the drive to the rotary drive and the impact mechanism is of excessively complex design. Complex means that a high number of mechanical components are required for the construction and operation of the transmission. Owing to the complexity, a transmission of this kind may be expensive to manufacture, produce and maintain. Moreover, transmissions of such complex design have a relatively high susceptibility to malfunctions or even complete failure.

It is therefore an object of the present invention to make available a power tool, in particular a hammer drill, to solve the abovementioned problem.

The present invention provides a power tool, in particular a hammer drill, comprising a housing, a tool fitting for receiving and holding a tool, an impact device for producing and transmitting impact pulses to the tool, and a rotation device for producing and transmitting a torque to the tool, wherein a working axis passing through the impact device is provided.

According to the invention, the power tool comprises a first drive unit having a first axis of rotation for driving the rotation device and a second drive unit having a second axis of rotation for driving the impact device, wherein the first and second drive units are arranged in such a way relative to one another in the housing that the first axis of rotation of the first drive unit is arranged at a first angle to the second axis of rotation of the second drive unit and at a second angle to the working axis.

As a result, it is possible to dispense with a single complex transmission and to make the power tool significantly simpler and more robust overall.

According to an advantageous exemplary embodiment, both the first angle and the second angle may be configured as acute angles, wherein the first angle can have a value of 50° to 80°, and the second angle can have a value of 10° to 30°.

As a result, the installation space within the housing can be used in a particularly effective way, and the power tool can be of compact configuration overall.

According to another advantageous exemplary embodiment, the first drive unit may comprise a first transmission device and the second drive unit may comprise a second transmission device.

This is a simple way of implementing an independent or separate transmission ratio from the first drive unit to the rotation device and from the second drive unit to the impact device.

According to an advantageous exemplary embodiment, the power tool may comprise a gearwheel in the form of a bevel gear for connecting the first drive unit to the rotation device.

It is thereby possible to achieve virtually optimum connection of the first drive unit to the rotation device.

Further advantages will become apparent from the following description of the figures.

Various exemplary embodiments of the present invention are illustrated in the figures.

The figures, the description and the patent claims contain numerous features in combination. A person skilled in the art will expediently also consider the features individually and combine them to produce useful further combinations.

BRIEF DESCRIPTION OF THE DRAWINGS

In the figures, identical and similar components and assemblies are denoted by the same reference signs.

Specifically.

DETAILED DESCRIPTION

Figure 1:
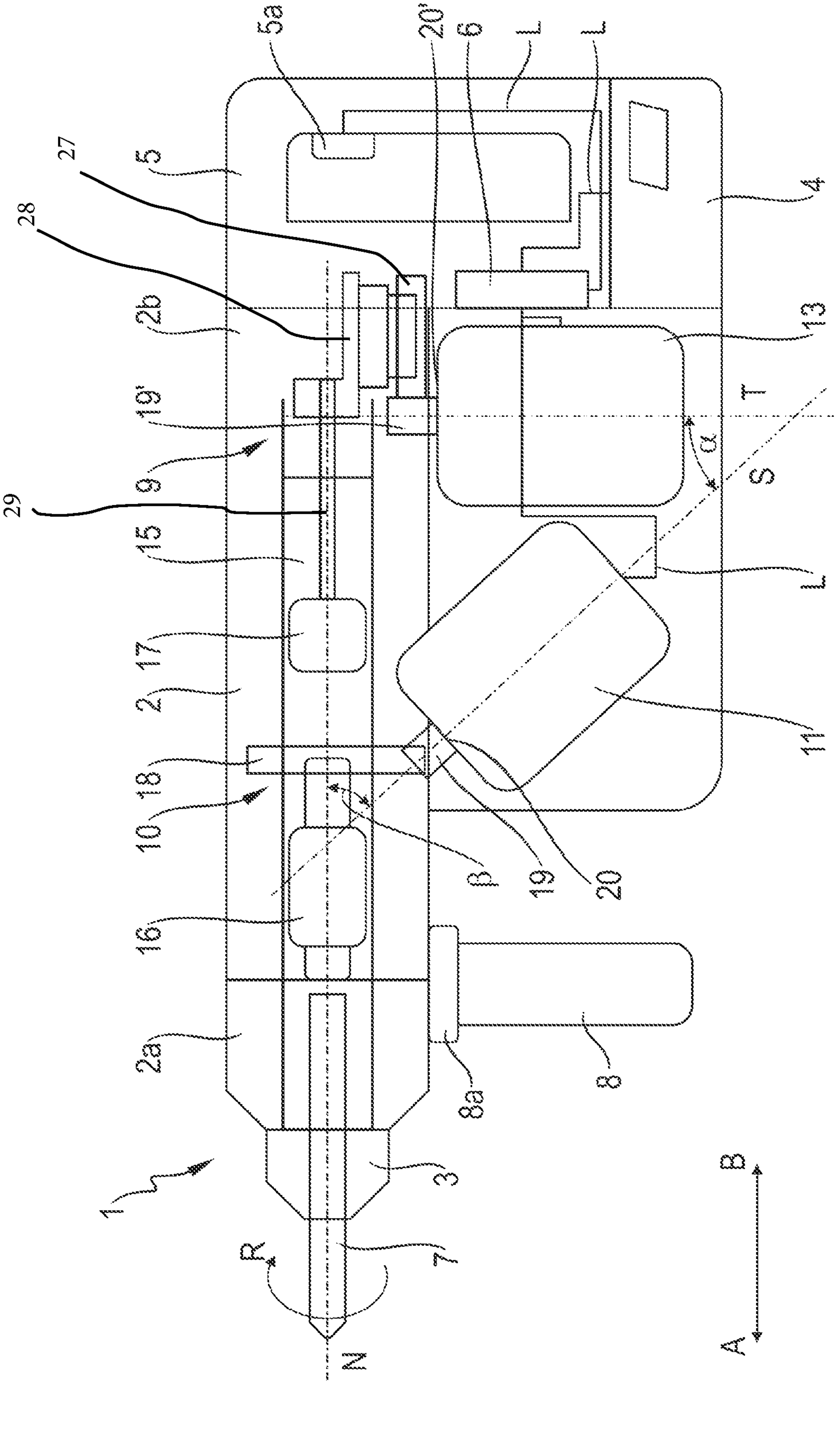
FIG. 1 shows a sectional side view of a power tool according to the invention in the form of a hammer drill having a first and a second drive unit, an impact device and a rotation device.

FIG. 1 shows a power tool 1 according to the invention in an exemplary embodiment as a hammer drill.

The power tool 1, which is configured as a hammer drill, has a housing 2, a tool fitting 3 and a power supply unit 4.

The housing substantially comprises a front end 2*a*, a rear end 2*b*, a left-hand side, a right-hand side, an upper side and a lower side.

As can be seen in FIG. 1, the power supply unit 4 and a first handle 5 are positioned at the rear end 2*b* of the housing 2. The first handle 5 is used by a user to hold and guide the power tool 1 and can also be referred to as the main handle. The user is not illustrated in the figures.

In this case, the first handle 5 comprises an activation switch 5*a* for activating the power tool 1. The activation switch 5*a* is connected to a control unit 6 and via leads L in such a way that the power tool 1 is transferred from a deactivation mode to an activation mode when the activation switch 5*a* is moved in arrow direction B. Conversely, the power tool 1 is transferred from the activation mode to the deactivation mode when the activation switch 5*a* is moved in arrow direction A by means of a spring. The control unit

6, for its part, is connected to the power supply unit 4 via leads L for the open-loop and closed-loop control of various functions.

The power supply unit 4 serves to supply electrical energy to the power tool 1. In the exemplary embodiment which is under consideration and is shown in the figures, the power supply unit 4 is in the form of a rechargeable battery (also referred to as a power pack or battery) that can be released from the power tool 1. According to an alternative exemplary embodiment, the power supply unit 4 may also be configured as an electrical cable for releasably connecting the power tool 1 to an electrical grid (that is to say electrical socket).

As is likewise apparent in FIG. 1, the tool fitting 3 is positioned at the front end 2*a* of the housing 2. The tool fitting 3 serves to receive and hold a tool 7. In the present exemplary embodiment, the tool 7 is configured as a drill. Alternatively, the tool 7 may also be configured as a chisel.

Moreover, a second handle 8 is positioned at the front end 2*a* of the housing 2 of the power tool 1. Together with the first handle 5, the second handle 8 is used for additional holding and guidance of the power tool 1 and may also be referred to as an auxiliary handle. The second handle 8 can be removed from the power tool 1 by means of a connection device 8*a*.

Figure 2:
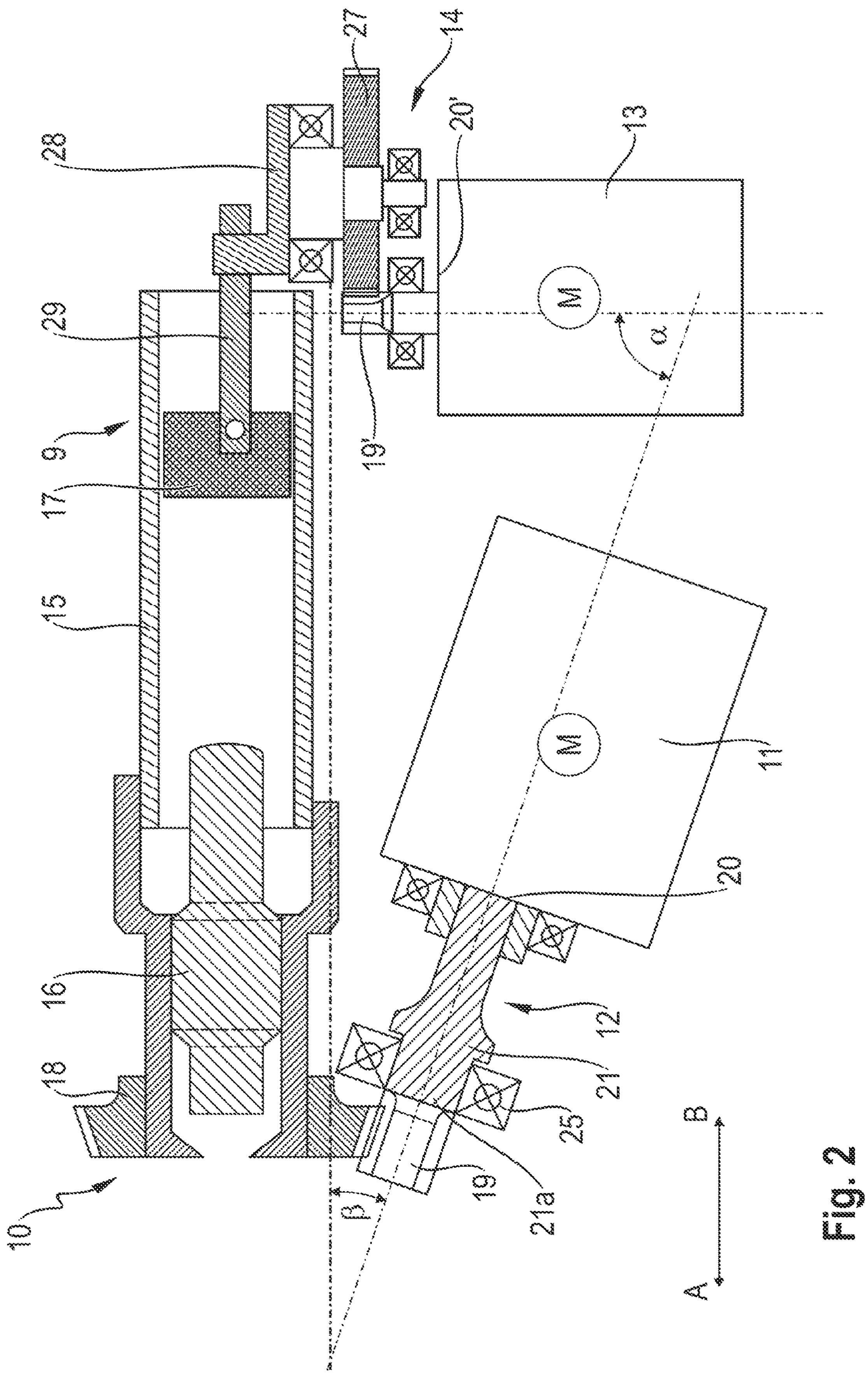
FIG. 2 shows a sectional side view of the first and second drive units, the impact device and the rotation device.
Figure 3:
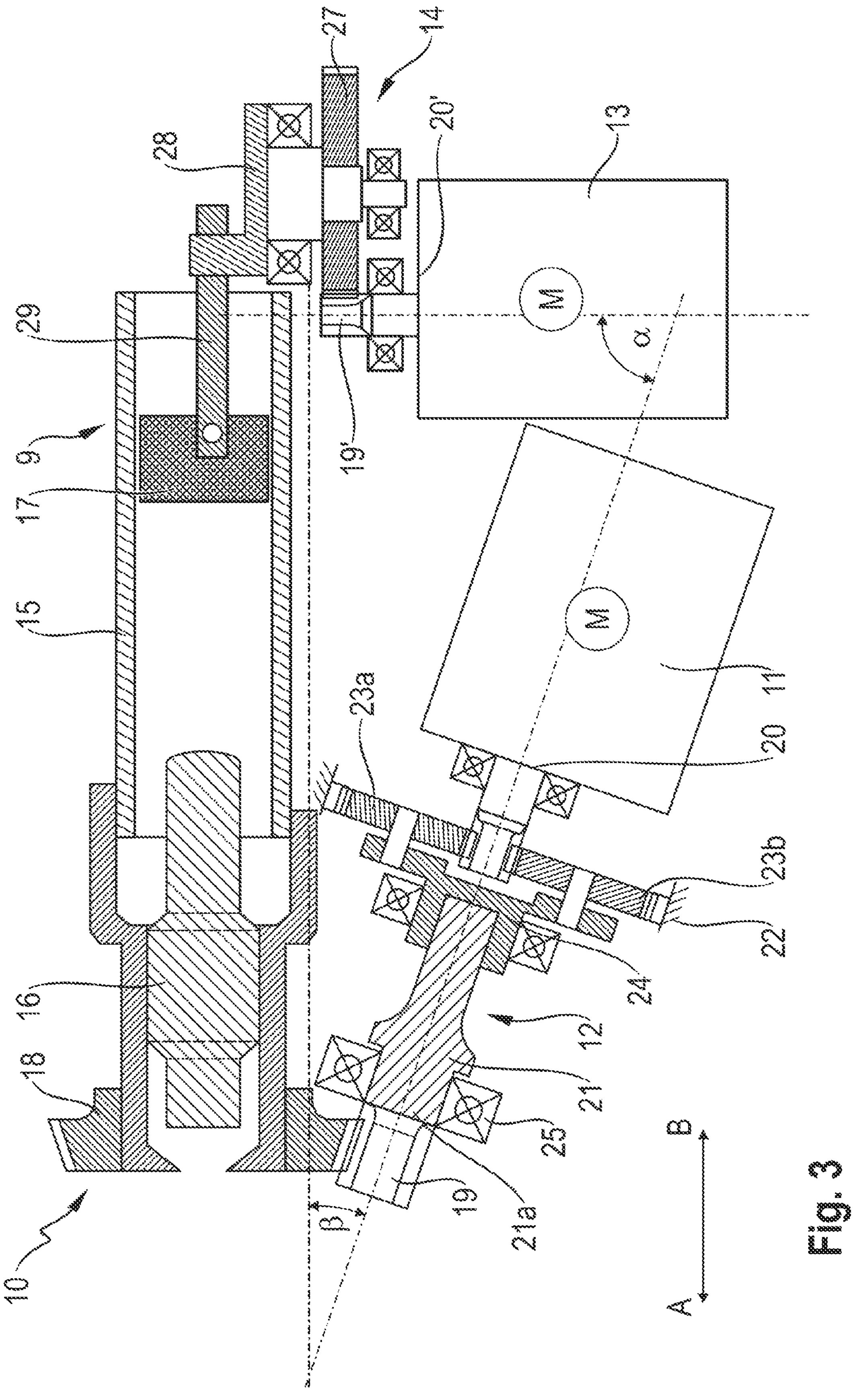
FIG. 3 shows a sectional side view of the first and second drive units, the impact device with a first transmission device, and the rotation device with a second transmission device.

As can be seen in FIGS. 2 and 3, it is essentially the control unit 6, an impact device 9, a rotation device 10, a first drive unit 11, a first transmission device 12, a second drive unit 13 and a second transmission device 14 that are contained within the housing 2.

As already mentioned above, the control unit 6 serves inter alia to exercise open-loop and closed-loop control over functions of the power supply unit 4. In addition, the control unit 6 performs individual open-loop and closed-loop control over various functions, such as the respective rotational speeds of the first drive unit 11 and the second drive unit 13.

The impact device 9 serves to produce and transmit impact pulses to the tool 7 and, for this purpose, substantially comprises a guide tube 15, an anvil 16 and an exciter piston 17. As illustrated in the figures, the anvil 16 and the exciter piston 17 are positioned inside the guide tube 15. In this arrangement, the anvil 16 is situated ahead of the exciter piston 17 in arrow direction A. The guide tube 15 is connected to the tool fitting 3 for conjoint rotation therewith, and therefore, when the guide tube 15 rotates about the working axis N in direction of rotation R, the tool fitting 3 also rotates about the working axis N in direction of rotation R, as does the tool 7 held in the tool fitting 3.

The rotation device 10 serves to produce and transmit a torque via the guide tube 15 and the tool fitting 3 to the tool 7, which is configured as a drill. For this purpose, the rotation device 10 substantially comprises a gearwheel 18 positioned around the guide tube 15 for conjoint rotation therewith. In the present exemplary embodiment, the gearwheel 18 is configured as a bevel gearwheel. Furthermore, the rotation device 10 comprises a pinion 19 (also referred to as a drive gearwheel) corresponding to the bevel gearwheel 18. As will be described in greater detail below, the pinion 19 is used to drive the gearwheel 18 configured as a bevel gearwheel. The pinion 19 can be positioned either directly on the end 20 of the rotor or on the end 21*a* of a drive shaft 21 connected to the end 20 of the rotor.

Both the first and the second drive unit 11, 13 are in the form of an electric motor and substantially comprise a stator and a rotor that can be driven around the stator. As can be seen in FIGS. 2 and 3, one end 20 of the rotor projects from the stator. In this arrangement, a first axis of rotation S passes through the center of the rotor of the first drive unit 11. The rotor of the first drive unit 11 is set in rotation around the first axis of rotation S. A second axis of rotation T passes through the center of the rotor of the second drive unit 13. The rotor of the second drive unit 13 is set in rotation around the second axis of rotation T.

The first drive unit 11 configured as an electric motor is connected to the rotation device 10. The second drive unit 13 configured as an electric motor is, in turn, connected to the impact device 9.

According to a first exemplary embodiment, the first drive unit 11 is connected to the rotation device 10 via a drive shaft 21, cf. FIG. 2. The drive shaft 21 is secured for conjoint rotation on the end 20 of the rotor which projects from the stator. The rotary motion of the rotor is transmitted to the drive shaft 21. The pinion 19 is secured on the opposite end 21*a* of the drive shaft 21 from the first drive unit 11. The pinion 19 is arranged in such a way in relation to the bevel gearwheel 18 that a rotary motion of the rotor of the first drive unit 11 is transmitted via the pinion 19 to the bevel gearwheel 18, the guide tube 15, the tool fitting 3 and, finally, to the tool 7. The teeth of the pinion 19 engage in the teeth of the bevel gearwheel 18 and drive the latter. By means of the direct or indirect connection of the first drive unit 11, the rotational speed of the rotor and of the pinion 19 is transmitted directly to the bevel gearwheel 18. The bevel gearwheel 18 and the pinion 19 are configured with a certain transmission ratio with respect to one another. The transmission ratio is determined by the number of teeth on the pinion 19 and the number of teeth on the bevel gearwheel 18 or by the ratio of the number of teeth on the pinion 19 to the number of teeth on the bevel gearwheel 18. In the present exemplary embodiment, the ratio of the number of teeth of the pinion 19 to the number of teeth of the bevel gearwheel 18 is 0.2 (that is to say zero point 2 in words). The number of teeth of the pinion 19 is identical to the number of teeth of the bevel gearwheel 18. According to alternative embodiments, the ratio of the number of teeth of the pinion 19 to the number of teeth of the bevel gearwheel 18 may be between 2 and 0.1. In particular, the ratio of the number of teeth of the pinion 18 to the bevel gearwheel 19 is between 0.1 and 0.5.

The length L of the first drive unit 11, the drive shaft 21 and the pinion 19 is 100 mm. According to alternative exemplary embodiments, the length L may be between 50 and 300 mm and, in particular, between 80 and 200 mm.

According to a second exemplary embodiment, the first drive unit 11 is connected to the rotation device 10 via a first transmission device 12, cf. FIG. 3. Here, the first transmission device 12 substantially comprises a ring gear 22, a first and second planet gear 23*a*, 23*b*, a planet carrier 24, a transmission ball bearing 25 and the drive shaft 21. The ring gear 22 is connected in a fixed manner to the housing 2 of the power tool 1. Both the first planet gear 23*a* and the second planet gear 23*b* are positioned in the ring gear 22. The pinion 19, which is positioned on the end 20 of the rotor of the first drive unit 11, drives the two planet gears 23*a*, 23*b*. By means of the two planet gears 23*a*, 23*b*, the planet carrier 24 is set in rotation. The planet carrier 24, in turn, is connected to the drive shaft 21, with the result that the drive shaft 21 is likewise set in rotation. The transmission ball bearing 25 serves to support the drive shaft 21. A further pinion 19 is positioned on the opposite end of the drive shaft 21 from the planet carrier 24. This pinion 19 transmits the rotary motion of the drive shaft 21 to the bevel gearwheel 18 and rotates the guide tube 15 about the working axis N.

The second drive unit 13 is connected to the impact device 9 via a second transmission device 14 in such a way that a torque that can be produced in the first drive unit 11 is transmitted to the exciter piston 17. For this purpose, the second transmission device 14 comprises a pinion 19', a gearwheel 27, an eccentric 28 and a connecting rod 29. The connecting rod 29 may also be referred to as a con rod, pushrod or main rod.

The pinion 19' is secured for conjoint rotation on the end 20' of the rotor of the second drive unit 13, which projects from the stator of the second drive unit 13. The gearwheel 27 of the second transmission device 14 is positioned in such a way relative to the pinion 19' that the gearwheel 27 is driven by the pinion 19'. The eccentric 28, in turn, is arranged relative to the gearwheel 27 in such a way that the gearwheel 27 drives the eccentric 28. The connecting rod 29 connects the exciter piston 17 to the eccentric 28, with the result that the movement of the eccentric 28 is transmitted to the exciter piston 17. The exciter piston 17 is moved by the eccentric 28 along the guide tube 15 in arrow direction A or B. By means of the movement of the exciter piston 17 in the guide tube 15, the anvil 16 is driven via a pneumatic spring present between the exciter piston 17 and the anvil 16. The anvil 16, in turn, transmits the impact pulses to the tool fitting 3 and the tool 7.

As shown in the figures, the first and second drive units 11, 13 are arranged in such a way relative to one another in the housing 2 that the first axis of rotation S of the first drive unit 11 is arranged at a first angle α to the second axis of rotation T of the second drive unit 13 and at a second angle β to the working axis N. According to the present exemplary embodiment, the value of the first angle α is 60° and the value of the second angle β is 20°. According to alternative embodiments, the first angle α can have a value of 50° to 80°, and the second angle β can have a value between 10° and 30°.

In the present exemplary embodiment, the first axis of rotation S lies in the same plane as the second axis of rotation T. According to an alternative exemplary embodiment, the first axis of rotation S and the second axis of rotation T may also lie in different planes.

LIST OF REFERENCE SIGNS

1 Power tool
2 Housing
2*a* Front end of the housing
2*b* Rear end of the housing
3 Tool fitting
4 Power supply unit
5 First handle
5*a* Activation switch
6 Control unit
7 Tool
8 Second handle
8*a* Connection device
9 Impact device
10 A rotation device
11 First drive unit
12 First transmission device
13 Second drive unit
14 Second transmission device
15 Guide tube
16 Anvil
17 Exciter piston
18 Gearwheel
19 Pinion on the rotor
19' Pinion on the rotor
20 End of the rotor
20' End of the rotor
21 Drive shaft
21*a* End of the drive shaft
22 Ring gear
23*a* First planet gear
23*b* Second planet gear
24 Planet carrier
25 Transmission ball bearing
27 Gearwheel
28 Eccentric
29 Connecting rod
L Leads
N Working axis
R Direction of rotation
S First axis of rotation of the first drive unit
T Second axis of rotation of the second drive unit

What is claimed is:

1. A power tool comprising:
a housing;
a tool fitting for receiving and holding a tool;
an impact transmitter for producing and transmitting impact pulses to the tool; and
a rotation transmitter for producing and transmitting a torque to the tool, the power tool defining a working axis passing through the impact transmitter; and
a first drive having a first axis of rotation for driving the rotation transmitter and a second drive having a second axis of rotation for driving the impact transmitter, wherein the first and second drives are arranged in such a way relative to one another in the housing that the first axis of rotation of the first drive is arranged at a first angle to the second axis of rotation of the second drive and at a second angle to the working axis;
wherein both the first angle and the second angle are configured as acute angles, wherein the first angle having a value from 50° to 80°, and the second angle having a value from 10° to 30°.

2. The power tool as recited in claim 1 wherein the first drive includes a first transmission and the second drive comprises a second transmission.

3. The power tool as recited in claim 1 wherein the rotation transmitter includes a bevel gear for connecting to the first drive unit.

4. The power tool as recited in claim 3 wherein the first drive has a drive shaft and the rotation transmitter includes a pinion on the drive shaft interacting with the bevel gear.

5. The power tool as recited in claim 1 wherein the power tool is a hammer drill.

6. The power tool as recited in claim 1 wherein the impact transmitter includes a guide tube connected to the tool fitting for conjoint rotation.

7. The power tool as recited in claim 6 wherein the impact transmitter further includes an anvil and an exciter piston positioned inside the guide tube.

8. The power tool as recited in claim 6 wherein the rotation transmitter includes a gearwheel positioned around the guide tube for conjoint rotation.

9. A power tool comprising:
a housing;
a tool fitting for receiving and holding a tool;
an impact transmitter for producing and transmitting impact pulses to the tool; and
a rotation transmitter for producing and transmitting a torque to the tool, the power tool defining a working axis passing through the impact transmitter, the rotation transmitter including a bevel gear;

a first drive having a first axis of rotation for driving the rotation transmitter and a second drive having a second axis of rotation for driving the impact transmitter, wherein the first and second drives are arranged in such a way relative to one another in the housing that the first axis of rotation of the first drive is arranged at a first angle to the second axis of rotation of the second drive and at a second angle to the working axis;

the bevel gear connecting the first drive unit to the rotation transmitter.

10. The power tool as recited in claim 9 wherein the first drive includes a first transmission and the second drive comprises a second transmission.

11. The power tool as recited in claim 9 wherein the power tool is a hammer drill.

12. The power tool as recited in claim 9 wherein the impact transmitter includes a guide tube connected to the tool fitting for conjoint rotation.

13. The power tool as recited in claim 12 wherein the impact transmitter further includes an anvil and an exciter piston positioned inside the guide tube.

14. The power tool as recited in claim 9 wherein the first drive has a drive shaft and the rotation transmitter includes a pinion on the drive shaft interacting with the bevel gear.

* * * * *